Figure 1:
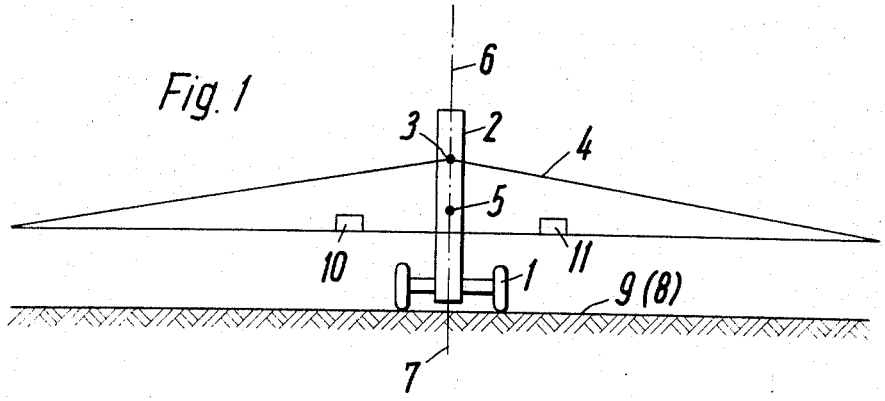
Figure 2:
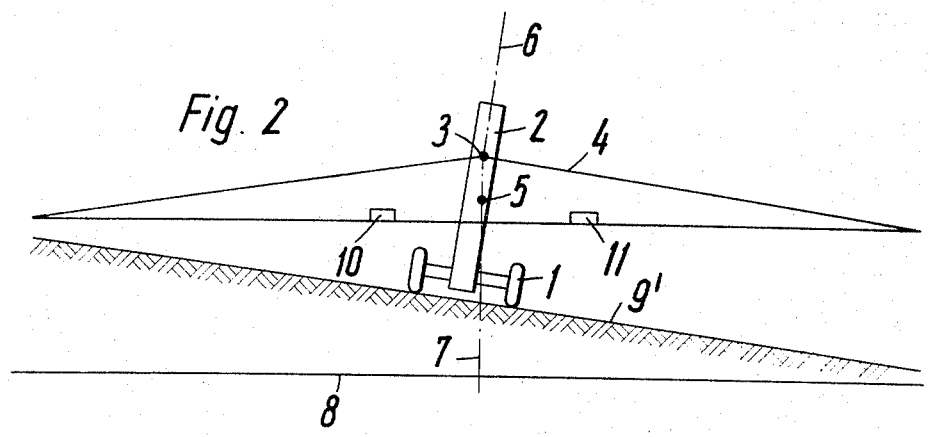

United States Patent [19]
Hoegen Dijkhof

[11] 3,731,879
[45] May 8, 1973

[54] SPRAYING BEAM FOR PEST CONTROL MEANS SUSPENDED FROM A VEHICLE

[75] Inventor: Hendrik Johannes Hoegen Dijkhof, Doetinchem, Netherlands

[73] Assignee: H. J. Hoegen Dijkhof G.m.b.H., Emmerich, Germany

[22] Filed: July 7, 1971

[21] Appl. No.: 160,440

[52] U.S. Cl. ..................239/167, 212/46, 212/49
[51] Int. Cl. ................................................B05b 1/20
[58] Field of Search.....................239/166, 167, 168, 239/161, 164; 212/46, 49

[56] References Cited

UNITED STATES PATENTS 3,580,505   5/1971   Loeffler..............................239/168
3,223,330   12/1965  La Plante..........................239/168

FOREIGN PATENTS OR APPLICATIONS 1,018,166   12/1952   France ................................239/166

*Primary Examiner*—M. Henson Wood, Jr.
*Assistant Examiner*—Michael Mar
*Attorney*—Imirie and Smiley

[57] ABSTRACT

In a spraying beam for pest control means suspended from a vehicle, it is known to mount the spraying beam to the vehicle by a rigid coupling. It is also known to freely suspend the beam from the vehicle to swing about an axis into the horizontal position, relative to the ground surface, so that its centre of gravity always settles vertically below said axis. In the present invention, the beam is suspended from a vehicle to swing about an axis lying in the direction of travel of the vehicle, the beam including a device by which the position of its centre of gravity can be displaced through the suspension axis. The device may comprise one or more trimming weights or an apparatus to displace the geometric suspension axis of the beam. Alternatively, the device may take the form of control signal emitters which act in response to the pivoting angle of one of the signal emitters relative to the spraying beam.

18 Claims, 12 Drawing Figures

Inventor:
HENDRIK J. HOEGEN DIJKHOF

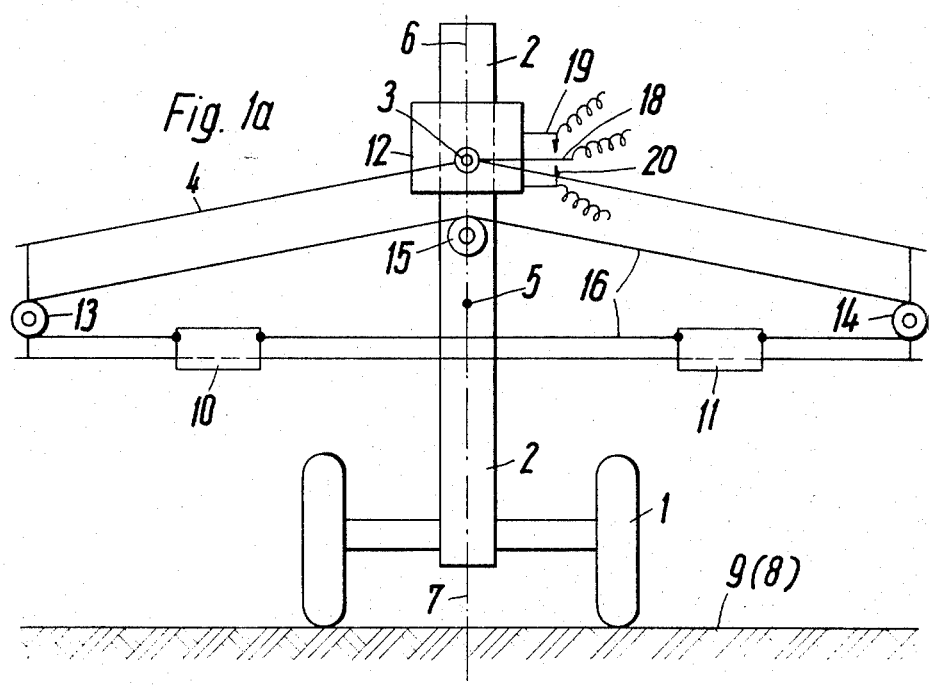
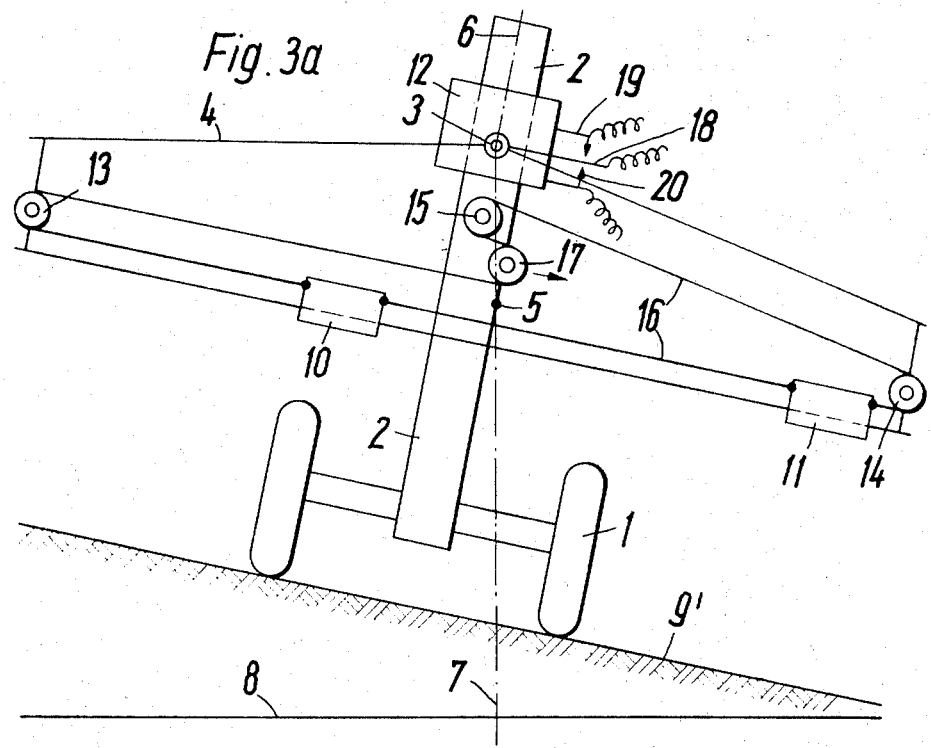

Inventor:
HENDRIK J. HOEGEN DIJKHOF

Inventor:
HENDRIK J. HOEGEN DIJKHOF

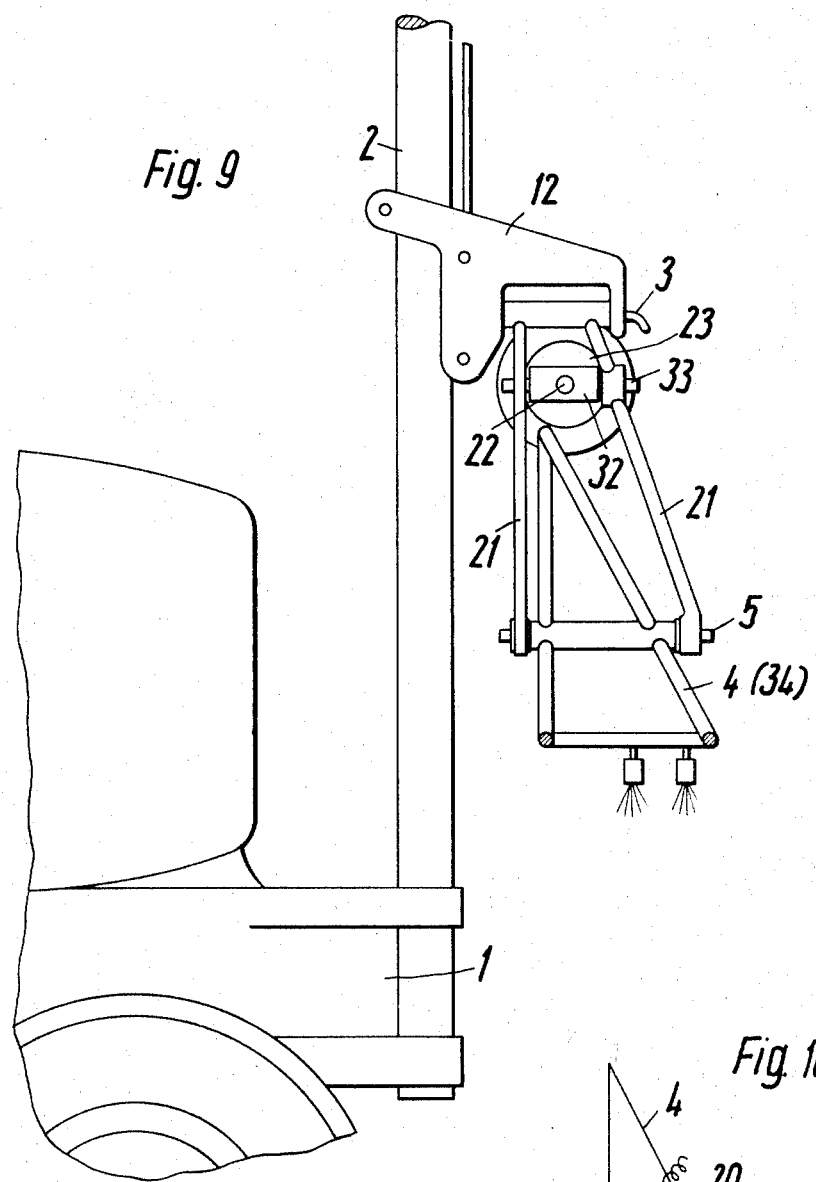
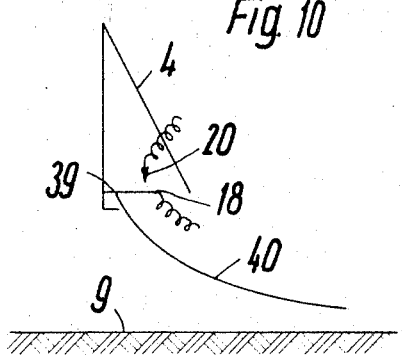

SPRAYING BEAM FOR PEST CONTROL MEANS SUSPENDED FROM A VEHICLE

The invention relates to a spraying beam for pest control means suspended from a vehicle to swing about an axis lying in the direction of travel of the vehicle. In known spraying beams of this type, as described, for example, in U.S. Pat. No. 2,305,913, the spraying beam does not swing freely about the axis lying in the direction of travel, but its lateral inclination, that is the angle it makes with a horizontal plane parallel to the vehicle axles, is constrained by the vehicle through an adjustable but rigid coupling.

The known spraying beam has the serious disadvantage that the spraying beam necessarily participates in the unavoidable rolling movements of the vehicle about its longitudinal axis, so that the spraying beam does not maintain the desired uniform position above the ground and in addition the attachment parts of the beam to the vehicle are very heavily loaded.

The spraying beam described in German Pat. specification No. 1,181,485 is admittedly free from this disadvantage, since it is suspended from the vehicle to swing freely about an axis lying in the direction of travel of the vehicle, its center of gravity always settling vertically below said axis, i.e., its suspension axis, when in the middle position. If the vehicle travels laterally along a slope, the spraying beam consequently remains in its horizontal position and therefore lies with its end towards the slope closer to the ground than the other end. To this extent therefore a freely swinging suspension for a spraying beam also possesses a serious disadvantage compared with the known spraying beam mentioned earlier, which participates in the lateral inclination of the vehicle and therefore maintains its desired position relative to the ground surface, even on a slope.

According to the present invention there is provided a spraying beam for pest control means suspended from a vehicle about an axis lying in the direction of travel of the vehicle, in which the freely suspended spraying beam includes a device, by which the position of its center of gravity can be laterally displaced from a vertical plane passing through the suspension axis.

According to a preferred embodiment of the invention, the device consists of one or more trimming weights which can be displaced longitudinally along the spraying beam, thus enabling the position of the overall center of gravity of the beam to be varied.

According to another form of embodiment of the invention, the device consists of an apparatus, by means of which the position of the geometric suspension axis of the spraying beam is variable.

Figure 3:
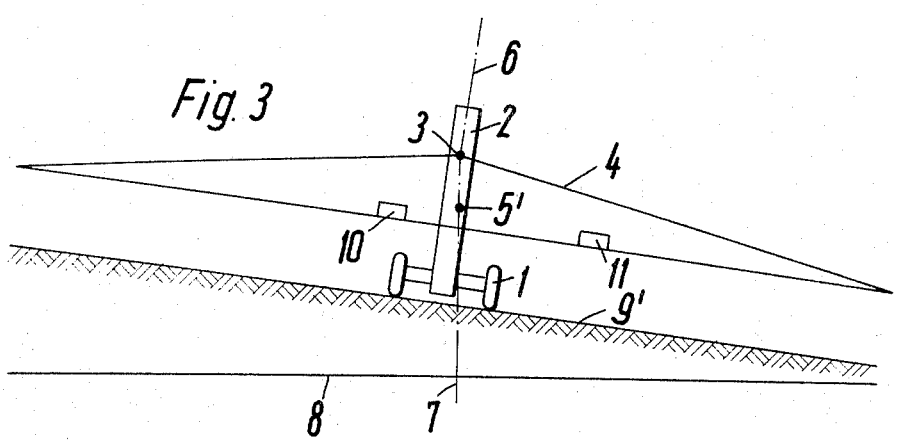

In both cases the mutual lateral displacement between suspension axis and center of gravity can be easily produced from the driver's seat, the remote control being effected either through purely mechanical means, for example through wires, hydraulically or electrically using reversible electric motors.

It will be appreciated that the mutual lateral offsetting according to the invention between suspension axis and center of gravity requires only a small amount of work energy = force $x$ distance, in contrast with constructions in which the pivoting of the spraying beam about the suspension axis is produced by direct force effect, since in the latter case the high moment of inertia of the long spraying beam about its suspension axis is significant, whereas when only lateral offsetting is involved, it remains insignificant and only comes into evidence when the beam swings again into the new equilibrium position. The low energy requirement also permits the use of electrical motors of low power, which can easily be driven from the vehicle battery.

It is also easy to automatically set the spraying beam to the necessary inclination to suit the slope, whereby a control signal emitter may either act between the spraying beam and vehicle in a manner to be described later, or in known manner between the spraying beam and the ground surface.

Embodiments of the invention will now be described, by way of example only, with reference to the accompanying drawings, in which:

FIG. 1 is a schematic rear view of a spraying beam with trimming weights suspended from a vehicle, FIG. **1*a* is an enlarged central detail of FIG. 1, FIG. 2 is a similar view to FIG. 1 showing the vehicle standing on sloping ground but with the spraying beam not yet adjusted to this slope, FIG. 3 is a similar view to FIG. 2 with the spraying beam adjusted by movement of the trimming weights to accommodate the ground slope, FIG. 3*a* is an enlarged central detail of FIG. 3, FIG. 4 is a diagrammatic view on an enlarged scale of a signal emitter for automatic slope adjustment of the spraying beam illustrated in FIGS. 1*a* and 3*a*, FIGS. 5 and 6 are diagrammatic details of the adjustment of the beam to the slope by offsetting its geometrical suspension axis, FIG. 7 is a similar view to FIGS. 5 and 6 of a spraying beam but with the addition of a signal emitter for automatic slope adjustment, FIG. 8 shows a constructional example of the embodiment shown in FIGS. 5 and 6 drawn to a larger scale, FIG. 9 is a side elevation of the spraying beam illustrated in FIG. 8, mounted on vehicle, FIG. 10** is a schematic side view of a spraying beam with a signal emitter actuated by ground surface sensors.

Referring now to the embodiment illustrated in FIGS. 1 and 2, a spraying beam 4 is mounted on a column 2 perpendicularly attached to a vehicle 1, and is freely suspended about a suspension axis 3 lying in the direction of travel of the vehicle, so that the center of gravity 5 of the spraying beam 4 continually and automatically adjusts itself vertically beneath the suspension axis 3, that is in the vertical plane 7 passing through this axis 3. If the vehicle 1 is standing on a horizontal surface 9 as shown in FIG. 1, the vertical plane 7 and the longitudinal axis 6 of column 2 constituting the upright axis of the vehicle 1, are aligned, so that the beam 4 lies horizontally.

If, however, the vehicle 4, as shown in FIG. 2, is on a ground surface 9' inclined to a horizontal plane 8, the spraying beam 4 remains in its horizontal position, although the longitudinal axis 6 of column 2 now makes with the angle with the vertical plane 7 corresponding to the inclination of the slope 9'. This is caused by the free suspension of the beam 4.

In order nevertheless to achieve the required position of the spraying beam 4 parallel to the inclined slope 9', two trimming weights 10 and 11 are mounted on the beam, slidably longitudinally thereon, by which the position of the center of gravity, as shown in FIG. 3, is moved away from the slope so that the resultant overall center of gravity 5' is produced. By suitable displacement of trimming weights 10 and 11, it is possible to make the spraying beam 4 adopt the position parallel to the inclined ground surface 9', in spite of and in fact due to the free suspension.

Due to the continuously retained free suspension, insensitivity to rolling movements of the vehicle is maintained in every position.

It must be mentioned, that in essence a single laterally displaceable trimming weight low down in the center of the beam can be used with the same effect. However, with the normally folding spraying beams having a relatively short central portion, only a slight displacement of the trimming weight would be possible, requiring a fairly heavy weight. By using two trimming weights 10 and 11 on the sideportions of the beam however, larger displacements and consequently lighter weights may be used.

FIGS. 1a and 3a show how the trimming weights 10 and 11 can be displaced by a wire or chain 16, passing over return pulleys 13 and 14 at both ends of the spraying beam 4 and driven by a pulley or winch 15 mounted on the beam 4. Alternatively, it is also possible to lead the free ends of the wire 16 directly to the vicinity of the driver's seat.

When a winch or a pulley (with the addition of a tensioning pulley 17 see FIG. 3a) is used, a reversible electric motor, switched on from the driver's seat, can be used for the drive.

In a further embodiment of the invention however adjustment of the beam to the ground slope can also be effected automatically, if, as shown in FIGS. 1a and 3a, there is mounted, between the vehicle 1, and more particularly in this case between a suspension piece 12 vertically adjustable on column 2, and the spraying beam 4, a control signal emitter comprising a central contact arm 18 attached to the spraying beam 4 and two contacts 19 and 20 attached to the suspension piece 12 and coming alternately into contact with the contact arm 18. When deviation occur from the mid position, in which the spraying beam is at right angles to the upright axis 6 of the vehicle 1, this control signal emitter, switches on an electric motor in the rotational direction and reinstates the mid position by sliding the trimming weights 10 and 11 to suitable locations, after which the electric motor is again switched off.

In corresponding manner, hydraulic valves can serve as control signal emitters, if hydraulic drives are used for sliding the trimming weights 10 and 11.

Figure 4:
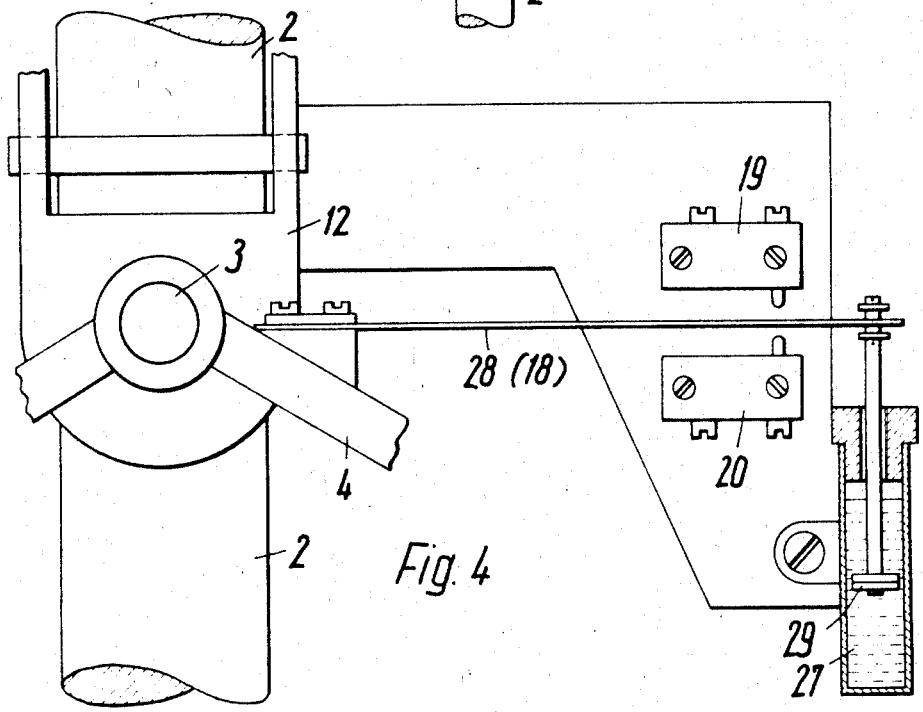

To prevent actuation of the signal emitter at every roll of the vehicle about its longitudinal axis with a brief departure from the mid position, the signal emitter may favorably be provided with a delay device, causing the emitter to emit control signals or to switch only after a deviation from the mid position has lasted a certain short minimum period. This may be produced by pure electrical means, for example by resistor-capacitor elements with suitable time constants. By contrast, FIG. 4 shows a simple purely mechanical method.

The central contact arm 18 attached to the spraying beam 4 or moved by the latter, consists of a plate spring 28 (or a pivoted lever held by prestressed springs) supported at the end by a small oil-filled damping cylinder, containing a piston 29 moving with clearance therein. During rapid oscillation of the column 2 of the vehicle relative to the beam 4, corresponding to the rolling frequency of the vehicle, the thus damped plate spring 28 does not actuate the contacts 19 and 20, indicated here as micro-switches, which are mounted on the suspension piece. Only when the deviation from the mid position has lasted more than a certain minimum period, which minimum period does not need to be shorter than the half natural frequency period of the freely suspended beam, is one of the contacts 19 and 20 actuated.

Figure 5:
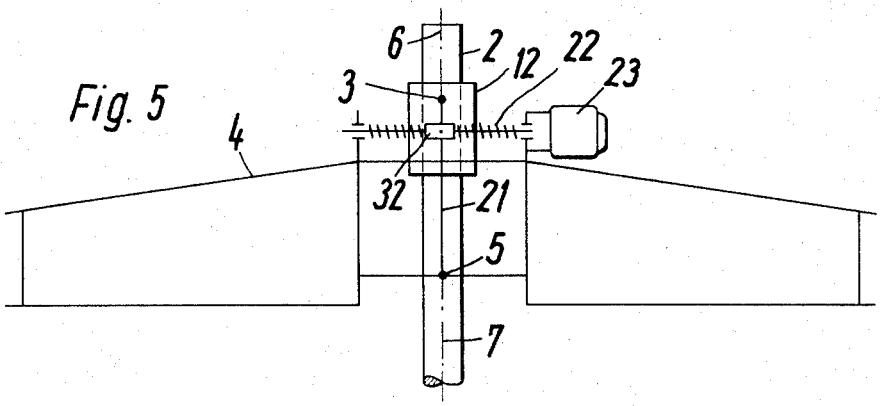

FIGS. 5 and 9 show how, even without using trimming weights with a freely suspended spraying beam, the position of its center of gravity may be displaced laterally from the vertical plane through the suspension axis. This is effected in a manner opposite to that previously described, in that, while the position of the center of gravity on the beam is maintained, its geometrical suspension axis is displaced laterally on the beam itself. This also enables the desired inclination of the beam to the horizontal to be achieved.

Figure 6:
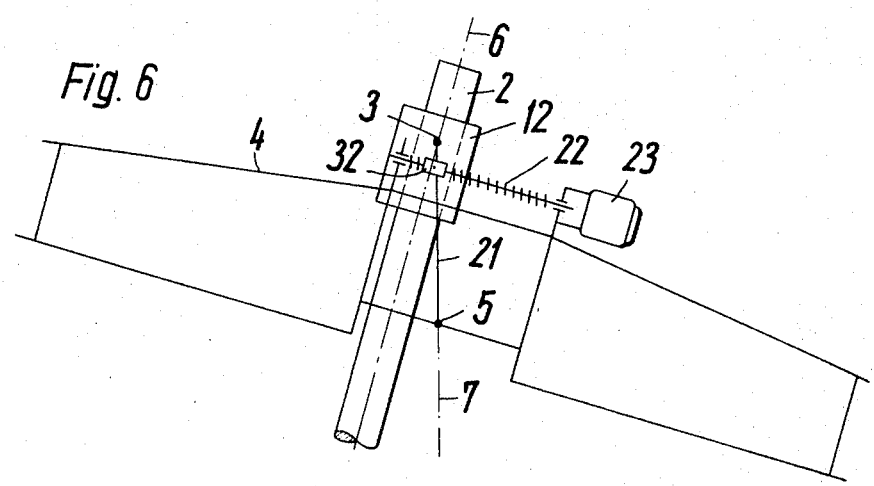

FIGS. 5 and 6 show an advantageous form of embodiment. The spraying beam 4 is suspended at the suspension axis 3 not directly, but indirectly by means of a suspension arm 21 hinged thereto which can be pivoted laterally about an axis lying in the direction of travel, which may coincide with the center of gravity 5, but does not necessarily have to.

The suspension arm can be driven sideways by a threaded spindle 22 mounted on the spraying beam 4 and driven by the geared motor 23, the threaded spindle 22 engaging with a nut 32 pivoting on the suspension arm 21.

Instead of the described arrangement using suspension arm 21, a horizontal slide guide may be provided on the beam 4, with the geometrical suspension axis 3 of the beam connected therewith.

Since the lateral displacement of the geometrical axis 3 for achieving the desired inclination of beam 4 only needs to be relatively small, a double-acting hydraulic piston drive may favorably be used instead of the spindle drive 22, 23, 32.

For the same reason, the principle of lateral displacement of the geometrical suspension axis 3 on the spraying beam 4 is suitable even for folding beams possessing only a short central portion, since the side parts hinged to this portion do not require any modifications and do not form part of the adjustment mechanism.

Figure 7:
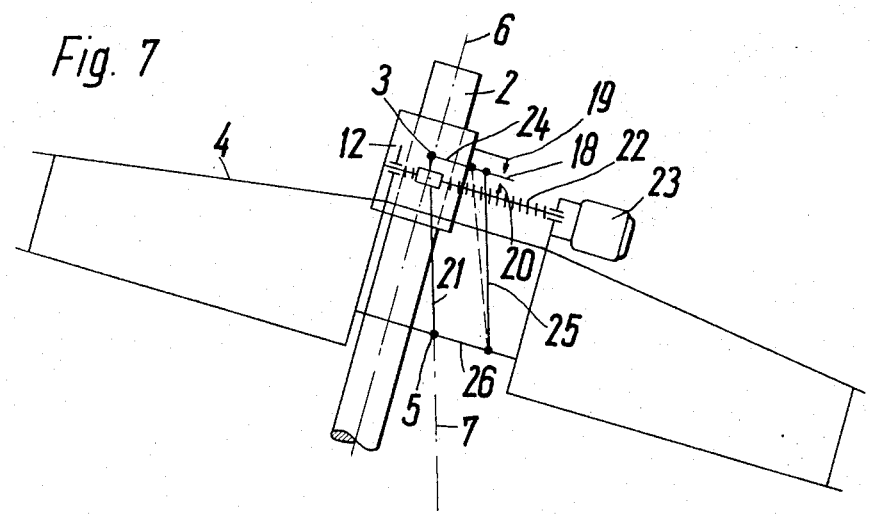

FIG. 7 shows, how in this case also a control signal emitter for automatic slope adjustment of the beam 4 can be incorporated. Due to the lateral displacement of the beam relative to its geometrical suspension axis 3, it is not possible, by contrast with the embodiment illustrated in FIGS. 1 – 4, to attach the central contact arm 18 directly to the beam 4 itself, if the two side contacts 19 and 20 are non-slidably mounted on the suspension piece 12. A guide rod 25, hinged at one end to the contact arm 18 and at the other to the beam 4 is therefore provided; together with the suspension arm 21 and the contact arm 18 and corresponding longitudinal portion 26 of the beam 4, acting as link members, this forms a hinged parallelagram, the upper left corner of which lies in the geometrical suspension axis 3. This causes the contact arm 18, while maintaining its position parallel to the beam 4, to effect pivotal movements about the fixed geometrical suspension axis 3 on the vehicle, without its position, considered longitudinally, changing with respect to the fixed side contacts 19 and 20 also mounted on the suspension piece. The mid position of contact arm 18 is also maintained, if the spraying beam 4 adjusts itself parallel to the ground surface, that is at right angles to the upright axis 6 of the vehicle.

Other arrangements can of course be envisaged to ensure that the contact arm 18 executes movements making the same angle as the beam 4 with the upright axis 6 of the vehicle. In this case also it is possible to use a damping device, as for example, illustrated in FIG. 4.

In the embodiments so far described with automatic adjustment of inclination of the spraying beam to the ground surface slope, the basis has been adopted that the upright axis 6 of the vehicle or vehicle body always remains at right angles to the ground surface, under the assumption that relative thereto the wheels of the vehicle also serve as sensing organs for the ground slope. This assumption is however often not admissible in practice, since on a slope the upright axis 6 of the vehicle body tends towards a greater inclination than the slope due to the simultaneous lateral displacement of the vehicle's center of gravity relative to the standing area. The causes of this are ground softness and elastic resilience of the vehicle tires and suspension.

FIG. 7 shows one possible method of largely automatically compensating within certain limits, this influence on the adjustment of the inclination of the spraying beam. The guide rod 25 is installed in the hinged parallelagram, for example in the position shown in dotted line, in such a way as to produce a simple hinged quadrilateral, the upper portion 24 of contact arm 18, acting as a link, being shorter than the corresponding opposite portion 26 of the beam 4. When the beam 4 is inclined to the horizontal mid position, in which the parts 24 and 26 are parallel, this causes the contact arm 18 to anticipate the inclination of the spraying beam, and to actuate the lower side contact 20 earlier. This causes the inclination of the spraying beam to be set to a value less than the too great inclination of the vehicle compared with the slope. If the difference in length between the portions 24 and 26 is made adjustable to different values, the correction achieved may be adjusted to the different circumstances, for example the particular ground conditions. This correction also may be effected from the driver's seat, for example by a pull-wire.

When the ground surface 9 is sensed as shown in FIG. 10 directly by sensing bars 40 hinged to the ends of the spraying beam 4, and pivoting about hinges 39 and directly connected with the contact arm 18, compensation between the different inclinations of ground surface and vehicle body is unnecessary. Here also however it is advantageous to have a damping arrangement for the contact arm 18, for example as shown in FIG. 4, so that this arm shall not be prematurely actuated by short ground undulations through the sensing bars 40.

Figure 8:
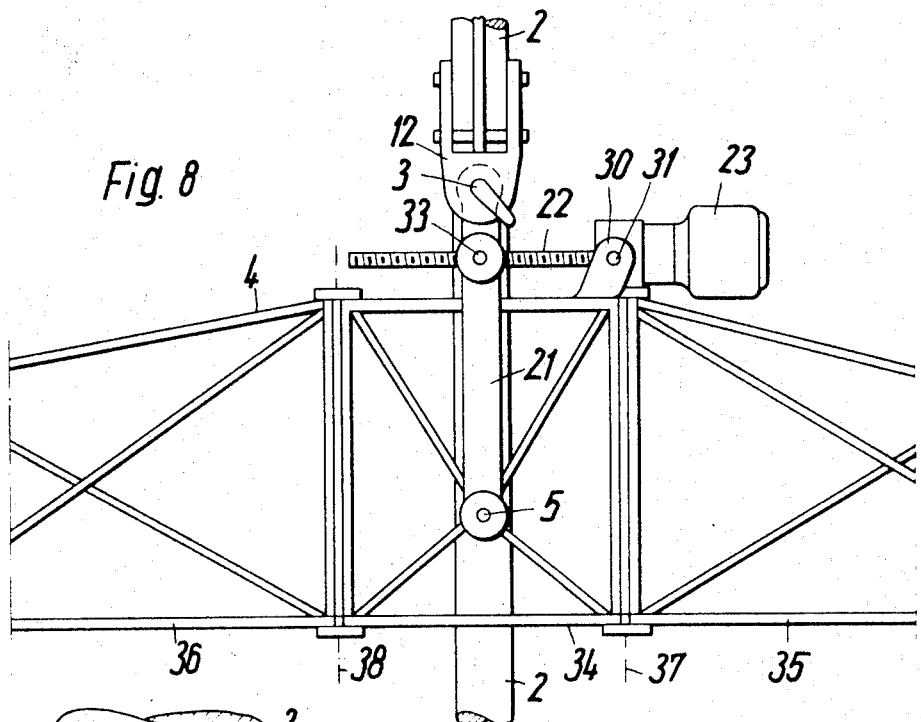

FIGS. 8 and 9 show a constructional example for the form of embodiment of the invention illustrated schematically in FIGS. 5 and 6, and capable also of being easily combined with the measures illustrated in FIG. 7.

The spraying beam 4 consists of a short central portion 34, to which the two side portions 35 and 36 are pivotally hinged on vertical axes 37 and 38. The central portion 34 is suspended from the suspension piece 12, to swing about the suspension axis 3 lying in the direction of travel of the vehicle, via the suspension arm 21 constructed as a torsion-resistant fork-shaped frame. The suspension piece 12 is height adjustable on the column 2 mounted on the body of the vehicle 1.

The fork-shaped suspension arm 21 is pivotally hinged to the middle part 34 by an axis also in the direction of travel of the vehicle, which contains the center of gravity 5. The lateral displacement of the suspension axis 3, at the upper end of the suspension arm, with respect to the spraying beam 4 is produced by a threaded spindle 22, which engages with a spindle nut 32 mounted on a journal lying in the direction of travel on the suspension arm 21 and which can be driven in either direction by a geared motor 23. So that the spindle 22 can follow the curved path of the spindle nut 32 abut the axis to the center of gravity 5, this spindle together with the geared motor 23 is pivotally mounted about an axis 31 lying in the direction of travel of the vehicle in a bearing block 30 attached to the central part 34.

In the embodiment shown in FIGS. 5 to 7, in which the threaded spindle 22 is not pivotal, the spindle nut 32 would have to be guided in a vertical guide on the suspension arm 21.

The embodiments of the invention to which an exclusive property or privilege is claimed are defined as follows:

1. A spraying apparatus comprising a spraying beam suspended from a vehicle about an axis disposed above the center of gravity and in the direction of travel of the vehicle, and means for laterally displacing the center of gravity of said beam from a vertical plane passing through the suspension axis, said means comprising at least one trimming weight displaceable longitudinally along the spraying beam.

2. A spraying beam according to claim 1, comprising a flexible connector for displacing the trimming weight.

3. A spraying beam according to claim 2, in which the flexible connection is led into the vicinity of the vehicle driver's seat.

4. A spraying beam according to claim 2, in which the flexible connection is trained around a pulley mounted on the spraying beam and drivable in either direction.

5. A spraying beam according to claim 4, in which a reversible electrical drive is in driving relation with the pulley.

6. A spraying beam according to claim 1, in which said means comprises an apparatus for laterally displacing the geometrical suspension axis of the spraying beam on the latter, whereby the center of gravity of the spraying beam can be displaced from a vertical plane passing through the suspension axis.

7. A spraying beam according to claim 6, in which the spraying beam is suspended at the suspension axis by means of a suspension arm laterally pivotally hinged to the beam about an axis lying in the direction of travel of the vehicle.

8. A spraying beam according to claim 7, in which the pivotable axis of the suspension arm lies in the center of gravity of the spraying beam.

9. A spraying beam according to claim 6, in which a spindle drive drive mounted on the spraying beam is provided for the lateral displacement of the geometric suspension axis.

10. A spraying beam according to claim 9, in which a reversible electric drive is provided for driving the spindle drive.

11. A spraying beam according to claim 10, in which control signal emitters for the drive are arranged in the vicinity of the driver's seat.

12. A spraying beam according to claim 10, in which the control signal emitters are automatically actuated by the relative inclination of an upright axis of the vehicle or vehicle body relative to a vertical plane.

13. A spraying beam according to claim 12, in which one of the control signal emitters is connected with the spraying beam to pivot through the same angle relative to the upright axis of the vehicle or vehicle body.

14. A spraying beam according to claim 12, in which one of the control signal emitters is so connected with the spraying beam, the pivotal angle of said signal emitter relative to the upright axis being greater than the pivotal angle of the spraying beam relative to said upright axis.

15. A spraying beam according to claim 14, in which the difference between the pivotal angle of one of the signal emitters and the spraying beam are selectively adjustable.

16. A spraying beam according to claim 11, in which the control signal emitters are actuated by ground sensors provided at the ends of the spraying beam.

17. A spraying beam according to claim 12, in which the movement of the movable control signal emitter is linearly damped and is produced by an elastic member.

18. A spraying beam according to claim 6 wherein a hydraulic piston drive is mounted on the spraying beam for effecting lateral displacement of the geometric suspension axis.

* * * * *